(12) United States Patent
Anderson et al.

(10) Patent No.: US 11,631,023 B2
(45) Date of Patent: Apr. 18, 2023

(54) QUANTUM MECHANICS AS A SERVICE

(71) Applicant: ColdQuanta, Inc., Boulder, CO (US)

(72) Inventors: Dana Zachary Anderson, Boulder, CO (US); Seth Charles Caliga, Lafayette, CO (US); Farhad Majdeteimouri, Broomfield, CO (US)

(73) Assignee: ColdQuanta, Inc., Boulder, CO (US)

( * ) Notice: Subject to any disclaimer, the term of this patent is extended or adjusted under 35 U.S.C. 154(b) by 289 days.

(21) Appl. No.: 16/914,497

(22) Filed: Jun. 29, 2020

(65) Prior Publication Data

US 2021/0295195 A1    Sep. 23, 2021

Related U.S. Application Data

(60) Provisional application No. 62/990,537, filed on Mar. 17, 2020.

(51) Int. Cl.
*G06N 10/00* (2022.01)
*H04L 67/146* (2022.01)
(Continued)

(52) U.S. Cl.
CPC .............. *G06N 10/00* (2019.01); *G06F 21/31* (2013.01); *G09B 23/20* (2013.01); *G21K 1/00* (2013.01);
(Continued)

(58) Field of Classification Search
CPC ........ G06N 10/00; G06N 10/40; G06N 10/80; G06F 21/31; G06F 21/6218; G09B 23/20;
(Continued)

(56) References Cited

U.S. PATENT DOCUMENTS 10,504,033 B1    12/2019 King et al.
11,334,812 B2 *    5/2022 Anderson ................ G21K 1/00
(Continued)

OTHER PUBLICATIONS

IBM, "IBM Quantum Experience is quantum on the cloud", web page downloaded Sep. 20, 2020, https://www.ibm.com/quantum-computing/technology/experience/?p1=Search&p4=43700050385922780&p5=e&cm_mmc=Search_Google-_-1S_1S-_-WW_NA-_-ibm%20quantum%20experience_e&m_mmca7=71700000061253574&cm_mmca8=aud-384354108630%3Akwd-397733481108&cm_mmca9=CjwKCAjw-5v7BRAmEiwAJ3DpuLwvDGM8dXqhr8sdgKddDIc2Nb4aPqWi2BinQ/.
(Continued)

*Primary Examiner* — James C Kerveros
(74) *Attorney, Agent, or Firm* — Van Pelt, Yi & James LLP; Clifton Leon Anderson

(57) ABSTRACT

A quantum-mechanics station (Ψ-station) and a cloud-based server cooperate to provide quantum mechanics as a service (ΨaaS) including real-time, exclusive, interactive sessions. The Ψ-station serves as a system for implementing "recipes" for producing, manipulating, and/or using quantum-state carriers, e.g., rubidium 87 atoms. The cloud-based server acts as an interface between the station (or stations) and authorized users of account holders. To this end, the server hosts an account manager and a session manager. The account manager manages accounts and associated account-based and user-specific permissions that define what actions any given authorized user for an account may perform with respect to a Ψ-station. The session manager controls (e.g., in real-time) interactions between a user and a Ψ-station, some interactions allowing a user to select a recipe based on wavefunction characterizations returned earlier in the same session.

11 Claims, 6 Drawing Sheets

(51) Int. Cl.
*H04L 67/306* (2022.01)
*G06F 21/31* (2013.01)
*G09B 23/20* (2006.01)
*G21K 1/00* (2006.01)

(52) U.S. Cl.
CPC .......... *H04L 67/146* (2013.01); *H04L 67/306* (2013.01)

(58) Field of Classification Search
CPC ....... G21K 1/00; H04L 67/146; H04L 67/306; H04L 2463/102; H04L 63/10; H04L 67/125; H04L 67/14; H04L 67/10; H04L 67/12
USPC .......................................................... 706/45
See application file for complete search history.

(56) References Cited

U.S. PATENT DOCUMENTS

| | | |
|---|---|---|
| 2019/0164076 A1 | 5/2019 | Kim et al. |
| 2021/0049494 A1 | 2/2021 | King |
| 2021/0410266 A1 | 12/2021 | Saffman |

OTHER PUBLICATIONS

IBM, Quantum Starts Here, Sep. 20, 2020.
Caliga, Seth C., "Experimental realization of atomtronic circuit elements in non-equilibrium ultracold atomic systems", Ph.D. Thesis, University of Colorado, 2016, pp. 1-153, Boulder, CO.
Castelvecchi, Davide, "IBM's quantum cloud computer goes commercial", Nature 543, 159, Mar. 9, 2017, https://www.nature.com/news/ibm-s-quantum-cloud-computer-goes-commercial-1.21585.
Devitt, Simon J., "Performing Quantum Computing Experiments in the Cloud", Physical Review A. 94. 10.1103/PhysRevA.94.032329.
Linke, N. M., "Experimental Comparison of Two Quantum Computing Architectures", Proceedings of the National Academy of Sciences Mar. 2017, 114(13) 3305-3310; DOI: 10.1073/pnas.1618020114.
Protalinski, Emil, "D-Wave announces Leap 2, its cloud service for quantum computing applications", VentureBeat, Feb. 26, 2020, downloaded from website on Sep. 20, 2020, https://venturebeat.com/2020/02/26/d-wave-announces-leap-2-its-cloud-service-for-quantum-computing-applications/.
Wikipedia, "IBM Q Experience", WikipediA article downloaded Sep. 20, 2020, https://en.wikipedia.org/wiki/IBM_Q_Experience.

* cited by examiner

QUANTUM MECHANICS AS A SERVICE

BACKGROUND OF THE INVENTION

The present invention relates to systems and processes for producing, manipulating, characterizing, and using cold (i.e., sub-milliKelvin) matter, including ultra-cold (i.e., sub-microKelvin) matter such as Bose-Einstein condensates (BECs). BECs have been used in a wide range of studies in fundamental physics including: interference between condensates due to wave-particle duality, superfluidity and quantized vortices, the creation of bright matter wave solitons from Bose condensates confined to one dimension, and the slowing of light pulses to very low speeds using electromagnetically induced transparency. However, the high acquisition cost and the high-level of expertise required to operate such BEC systems, which typically include matter-wave (e.g., rubidium and cesium atoms) sources, ultra-high vacuum (UHV) systems, laser systems, magnetic systems (i.e., systems for producing and controlling magnetic fields), and electronics for operating the laser and magnetic systems, constrains their availability for research and development.

DETAILED DESCRIPTION

The present invention provides for quantum-mechanics-as-a-service (ΨaaS) in that account holders can operate a quantum-mechanics station remotely via the Internet or other network. The present invention further provides for real-time, exclusive, interactive production and/or manipulation of quantum-state carriers. Herein, "quantum-state carriers" includes elementary particles and combinations of elementary particles whose state can be represented as a wavefunction, i.e., solution to Schrödinger's equation. Examples of quantum particles include, without limitation, neutral and charged atoms, photons, and Bose-Einstein condensates.

The ΨaaS allows account holders access to BECs and other quantum phenomena without the burden of purchasing and maintaining the associated equipment.

Furthermore, potential purchasers of the equipment can evaluate the equipment prior to purchase. Thus, the invention allows more people to development quantum-mechanics-based applications.

Herein, "real-time" refers to actions being initiated by a station containing the quantum-state carriers within ten seconds of a user request for those actions. "Exclusive" refers to the prevention of access to a quantum system by users other than the session owner. "Interactive" refers to actions being taken in response to user requests based on results of previous user actions in the same session.

Figure 1:
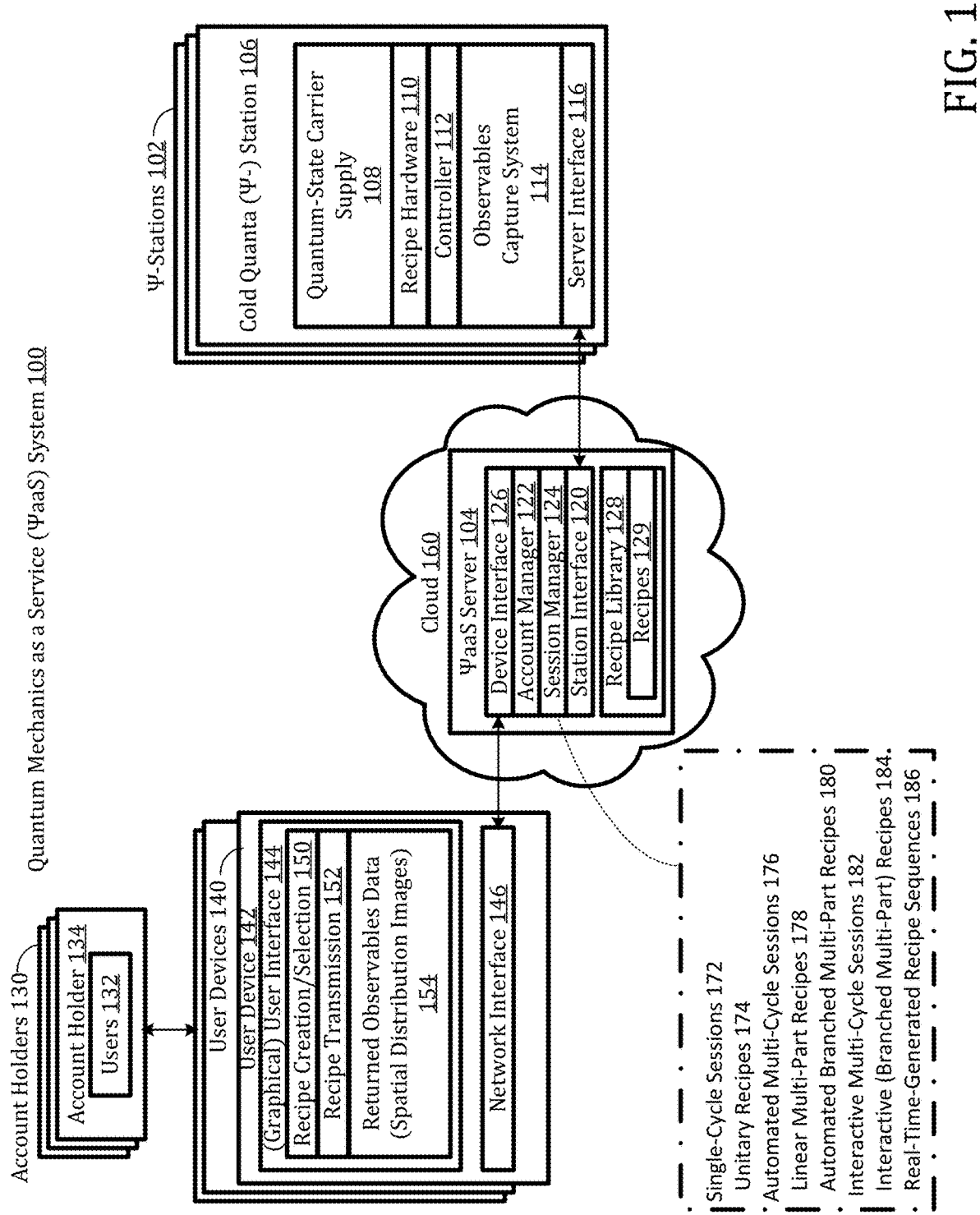
FIG. 1 is a schematic illustration of a quantum-mechanics-as-a-service (ΨaaS) system.

As shown in FIG. 1, a quantum-mechanics as-a-service (ΨaaS) system 100 includes a set 102 of quantum-mechanics stations (Ψ-stations) and a cloud-based ΨaaS server 104. Set 102 includes one or more Ψ-stations including representative Ψ-station 106. Ψ-station 106 includes a quantum-state carrier supply 108, recipe hardware 110, a controller 112, an observables capture system 114, and a server interface 116.

Quantum-state carrier supply 108 can, for example, supply rubidium 87 ($^{87}$Rb) atoms, which can assume different quantum states depending on the excitation level of its single-electron outer shell. When cooled to a sufficiently low temperature, as determined by a phase-space density, a cloud of $^{87}$Rb atoms can form a Bose-Einstein condensate in which the atoms share a common quantum state. Other quantum-state carriers include other isotopes of rubidium, other alkali atoms, alkaline earth metal atoms, atoms of other elements, molecules, ions, quasi-particles, virtual particles, quantum dots, photons, other bosons, and various fermions. Depending on the embodiment, a quantum-state carrier supply can provide exactly one type of quantum-state carrier or plural types of quantum state carriers (e.g., potassium and cesium).

Recipe hardware 110 is used to process supplied quantum-state carriers according to a recipe. The processing can include cooling, transport, and inducing phase and/or state transitions. The hardware for Ψ-station 106 can include a vacuum system, a laser system, optical path elements, a magnetics system, and an electronics system. The components of these systems can overlap; for example, an atom chip can serve as part of a vacuum boundary, conduct currents to form magnetic fields, and include a window for optical access to the vacuum interior. In other embodiments, e.g., involving an all-optical BEC, there is no atom chip. A controller 112, which may be integrated into the electronics system, coordinates the hardware actions to implement a recipe received over server interface 116 from ΨaaS server 104.

Observables capture system 114 captures observables of quantum-state carriers to provide wavefunction characterizations, i.e., characterizations of the quantum state. A recipe can specify which observables are to be captured, as well as how the capture is to be effected. For example, a fluorescence or absorption image of a BEC may be captured to characterize a wavefunction (or spatial distribution) of the BEC. In another example, population counts and distribution statistics regarding quantum-state carriers serve as wavefunction characterizations. The captured wavefunction characterization, either as collected or in modified form, is transmitted back to a user via ΨaaS server 104.

As "wavefunction characterization" is used herein, not all information that might be returned to a user qualifies as a wavefunction characterization. For example, if an atomic clock returns a time to a user, that time does not qualify as a wavefunction characterization because it is not descriptive of a quantum state. For another example, unencrypted content decrypted by a quantum computer would not qualify as a wavefunction characterization as it does not include information descriptive of a quantum state. Of course, an actual wavefunction characterization could be returned along with the time or the unencrypted content.

ΨaaS server 104 includes a station interface 120, an account manager 122, a session manager 124, a device interface 126, and a recipe library 128 of recipes 129. Account manager 122 manages accounts of individual users and corporate entities; this includes managing financial transactions with account holders 130, which determine permissions for each account. In addition, account manager 122 serves to identify, authenticate, and manage permissions of authorized users for each account holder, e.g., authorized users 132 of account holder 134.

Account manager 122 can provide for a variety of account types. For example, accounts can provide for on-demand access, scheduled access, and stand-by access. On-demand access provides priority access pending completion of a currently implementing recipe and any on-demand recipes in the queue ahead of the current one. Scheduled access means access at a future time from a choice of times offered by the session manager and subject to change due to conflicts with higher-priority recipes. Stand-by access means that the recipe is to be executed when time is available; the user will be notified when results are available. Access may be real-time in that the user remains connected while the recipe is being implemented, or the access may be off-line. An account holder may grant some of its authorized users, e.g., system administrators, all the permissions associated with the account type, while it may grant others of its authorized users more restricted sets of permissions.

Authorized users can access ΨaaS server 104 via respective user devices 140, which include, without limitation, computers and mobile devices. User device 140, for example, includes a graphical user interface 144 and a network interface 146. Graphical user interface 144 provides functionality for recipe creation and/or selection 150, and recipe transmission 152.

An authorized user can select recipes either directly from recipe library 128 on ΨaaS server 104 or from a local recipe library on a user device 142. The latter library can be updated using entries in cloud recipe library 128 or by storing recipes created on the user device by the user. Recipes in library 128 may be selectively forbidden to users based on the respective account and user permissions. These recipes can include: unitary recipes 174 that provide for exactly one recipe request in a session, and multi-part recipes 178, 180, 184, and 186 providing for a series of requests allowing a user to see the result of a first portion of a recipe before deciding to proceed on a second or subsequent portion of a multi-recipe. A user with sufficient permissions can create a multi-part recipe in the form of a sequence of other recipes.

Herein, an "online session" is one user request or a series of user requests (e.g., recipe transmissions) and responses (wavefunction characterizations) during which the user retains exclusive real-time access to a Ψ-station. An "offline session" involves implementing a recipe while the user is offline (as when a recipe submitted by the user implemented on a stand-by basis or unattended scheduled basis).

Session manager 124 of ΨaaS server 104 tags the received recipe with a session identifier so that any results of the recipe can be returned to the correct device and user. In the case of a multi-cycle session, session manager 124 uses the tag to maintain inter-cycle continuity among plural session cycles, i.e., recipe-result transactions, where such multiple transactions are permitted (e.g., by the permissions associated with the account and the user). ΨaaS server 104 forwards tagged recipes from station interface 120 to server interface 116 of Ψ-station 106 (or other station). Wavefunction characterizations captured during recipe implementation are returned to ΨaaS server 104, which forwards the wavefunction characterizations, possibly in modified form, to the user device that originated the recipe. The GUI 144 for the device can display the wavefunction characterization as appropriate, e.g., as images, graphs, tables, etc.

ΨaaS system 100 provides for different session types including single-cycle sessions, automated multi-cycle sessions, and interactive multi-cycle sessions. Single-cycle sessions 172 typically implement unitary recipes 174. Herein, a "recipe" is a document specifying initial conditions and procedures for yielding a result, typically in the form of a quantum wavefunction or a characterization of a quantum wavefunction. For example, a recipe for a Bose-Einstein condensate would specify the equipment and initial state of a Ψ-station as well as the operations required to generate a Bose-Einstein condensate using that Ψ-station. A single-cycle session typically terminates once the result, e.g., a characterization of a wavefunction for a Bose-Einstein condensate, is reported to the user.

Multi-cycle sessions permit additional procedures to be performed after a result is reported earlier in the session. In the case of automated multi-cycle sessions, the procedures follow results without user intervention. Automated multi-cycle sessions 176 can implement linear multi-part recipes 178, which provide no choices to be made regarding which procedures are to be implemented regardless of results, and automated branched multi-part recipes 180 for which procedures following results are selected automatically, e.g., by the session manager or the Ψ-station, based on the results. In an automated multi-cycle session, results may be reported to the session manager each cycle; these results may be forwarded to the user or aggregated so that only the aggregate result is forwarded to the user at the end of the session.

Herein, a "branched" recipe is a recipe that includes alternative procedures to be selected based on a condition, which may be a result from a previous part or procedure of the recipe, a user input, or some other factor (e.g., time). Branched recipes that condition a selection of alternative procedures on a user input after the respective session begins are termed "interactive", whereas recipes that do not accept such input are termed "automated".

Interactive multi-cycle sessions 182 provide users with real-time, exclusive, and interactive access to quantum-state carriers via a Ψ-station. Interactive branched multipart recipes 184 permit users to select between/among branches, taking into account results from previous cycles in the session. In the case of such interactive recipes, the user's choices are specified and limited at the outset by the recipe. In the case of real-time generated recited sequence 186, the user's choices are not limited by the first recipe requested. However, follow-up recipes must accept as initial conditions the end conditions of a previous cycle, so the user's choices are not unlimited.

Figure 2:
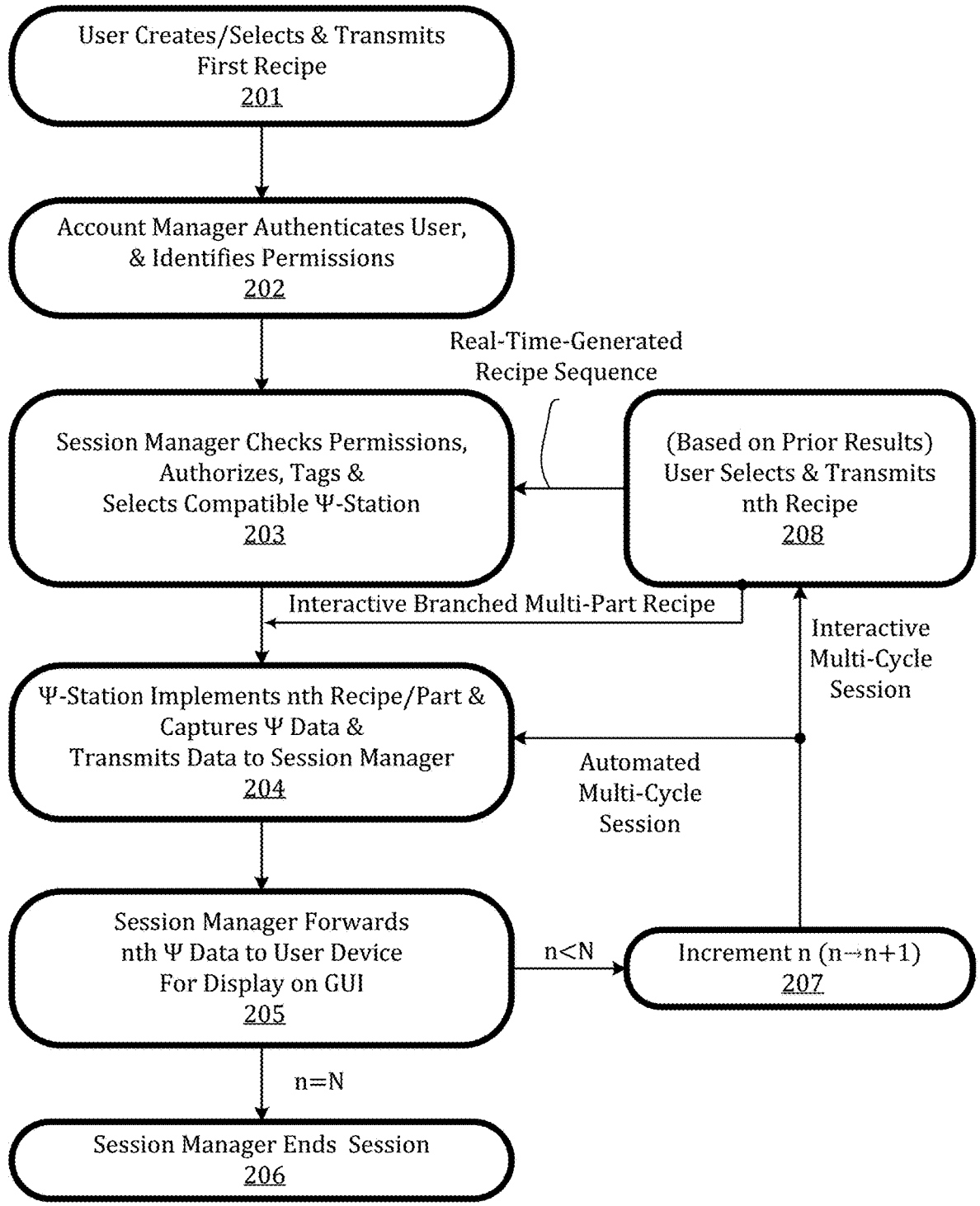
FIG. 2 is a flow chart of a ΨaaS process.

A quantum-mechanics-as-a-service (ΨaaS) process 200 is flow charted in FIG. 2. At 201, an authorized user creates and/or selects a first recipe and transmits it to a ΨaaS server. At 202, an account manager running on the ΨaaS server authenticates the user and identifies the permissions applicable to that user. These permissions are those associated with the account and have not been excluded for use by the present user or the present user's role in the account holder.

At 203, a session manager running on the ΨaaS server checks the applicable permissions, authorizes the recipe (if it qualifies given the permissions), tags the recipe with a session identifier, and routes the tagged recipe to a compatible Ψ-station. For example, if the recipe calls for the use of $^{87}$Rb atoms, the session manager can route the recipe to a Ψ-station set up with an $^{87}$Rb source, rather than to, for example, a Ψ-station set up with a $^{133}$Cs source. More specifically, the selected Ψ-station and its current state are to be compatible with the first recipe; in the illustrated embodiment, the session manager rejects a subsequent recipe (in the same session) that is incompatible with the selected Ψ-station. In an alternative embodiment, a subsequent recipe in the same session may be routed to a different Ψ-station compatible with the subsequent recipe.

At 204, the selected Ψ-station then implements a first (n=1) recipe or part of a multi-part recipe, captures first observables data (i.e., a wavefunction characterization), and transmits a station response to the session manager, the station response being based on the observables data. The capturing may be destructive or non-destructive. For example, many imaging techniques impact the quantum state of the quantum-state carriers; however, there are dispersive phase-contrast imaging techniques that are non-destructive. At 205, the session manager then forwards the first observables data to the user for display on the GUI of the user device. More precisely, the session manager transmits a server response based on the station response and, thus, based on the observables data. In some automated multi-cycle sessions implementing multi-part recipes, observables data is not sent to the user each cycle, but rather data collected over multiple cycles is accumulated and sent collectively to the user, e.g., at the end of the session.

Commonly, the sessions are unitary recipe (N=1) sessions, in which case, the session manager ends the session at 206 once the first observables data is sent to the user device. The session may also end due to a time-out or a user request for disconnection. However, for certain premium accounts, multi-cycle sessions can be permitted. In such case, process 200 proceeds from action 205 to a virtual action 207 of incrementing n, that is n→n+1.

How process 200 proceeds from 207 depends on the type of multi-cycle session. In the case of an automated multi-cycle session implementing a linear or automated branched multi-part recipe, the session returns to 204 to implement a next, nth, part of a multi-part recipe, and proceeds from there to 205. In the case of an interactive multi-cycle session, the session proceeds to 208 to select a next, nth, recipe or recipe part, in some cases based on prior results.

In the case of an interactive multi-cycle session that allows a user to generate a recipe sequence in real-time, that is, as the session progresses, the user selects a next, nth, recipe at 208, e.g., based on results from earlier cycles in the session. The newly selected recipe is then, in effect, vetted as the session returns to 203 and proceeds from 203 to 204 and 205, and so on. Typically, but not in all cases, the Ψ-station selected at 203 is the same across cycles of a session.

In the case of an interactive multi-cycle session implementing an interactive branched multi-part recipe, the choices made by a user at 208 can be constrained to pre-approved recipe parts. For example, after a previous recipe part results in a BEC and corresponding observables data returns a population count for the BEC, a user can decide (e.g., based on the population count) to use the BEC for some purpose or to reinitialize and form a new BEC. After the user selects an nth recipe part, the session can proceed from 208 directly to 204, bypassing vetting at 203. The session can then proceed to 205 and so on until completion.

In the event that the data captured at the most recent capture (action 204) is non-destructive, the next recipe can use, as a starting point, the state involved in that capture. If the data capture is destructive, the next recipe can use a state prior to the capture state as a starting point. For example, the system can be reinitialized and the recipe can start with the release of a new population of rubidium atoms or other quantum-state carriers. Alternatively, an earlier recipe may have left a reservoir of (e.g., pre-cooled) quantum-state carriers, so the next recipe can begin by drawing a new population from the reservoir (instead of returning to the quantum-state carrier sources).

Consider a user that desires to tune BEC-production parameters to achieve a BEC with a target numerosity (number of atoms, in this case) before using the BEC in an atomtronic transistor or shaken lattice. Because conditions within a Ψ-station may degrade or otherwise change with intervening time and usages, it may not suffice to rely on tunings developed in previous sessions. A multi-recipe session allows BEC production parameters to be tuned at nearly the same time as the usage and without intervening sessions. Such real-time, exclusive and interactive usage of a Ψ-station thus provides significant advantages over multiple single-recipe sessions. Herein, a multi-cycle session would not be considered "exclusive", if, another's user session altered a quantum state achieved during the session.

Figure 3:
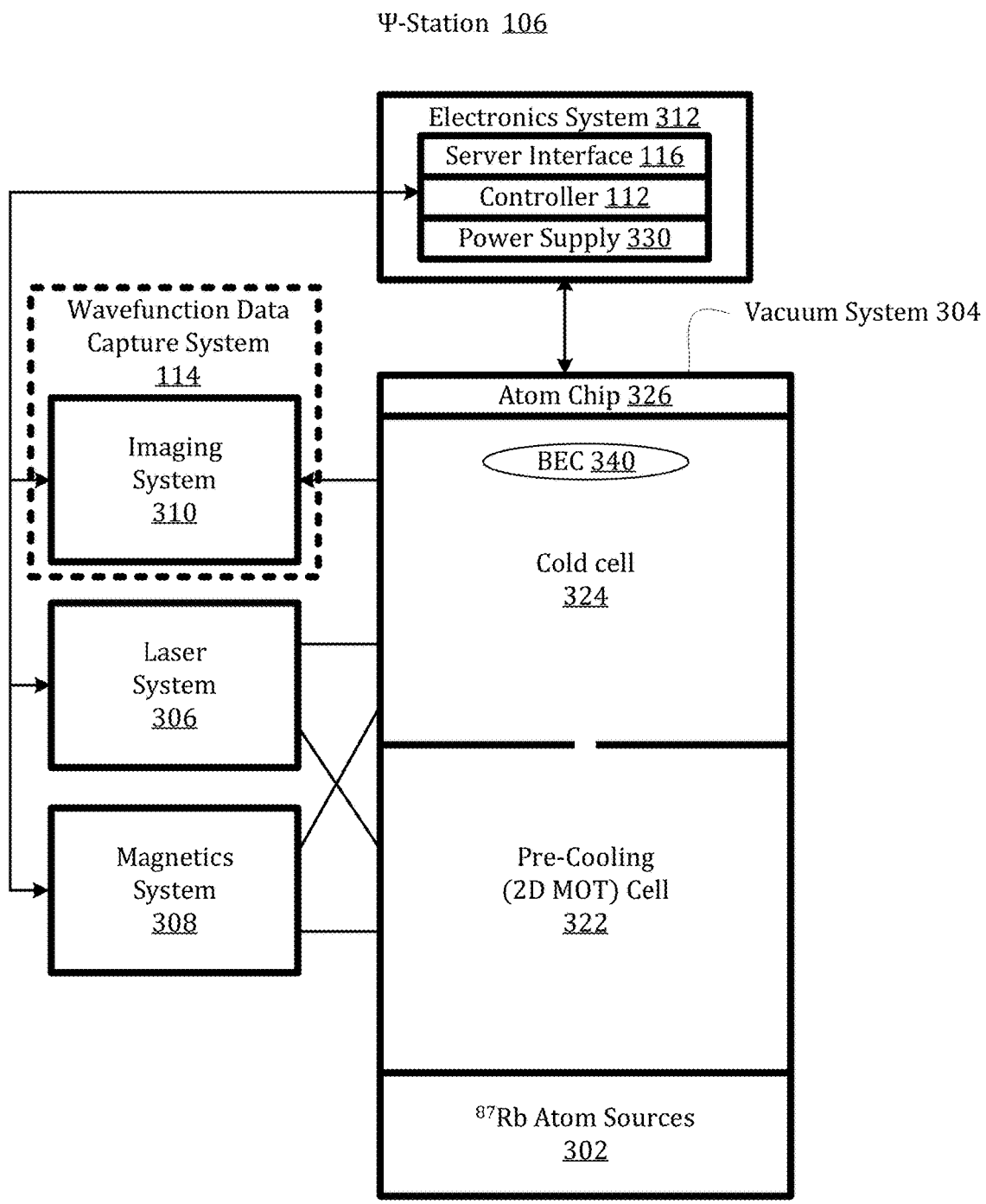
FIG. 3 is a schematic illustration of a Ψ-station of the system of FIG. 1.

Ψ-station 106, shown in greater detail in FIG. 3, includes a pair of $^{87}$Rb sources 302, a vacuum system 304, a laser system 306, a magnetics system 308, an imaging system 310, and an electronics system 312. Vacuum system 304 includes a pre-cooling cell 322 and a cold cell 324, which is capped by an atom-chip 326 that forms part of the vacuum boundary for vacuum system 304. Electronics system 312 includes controller 112, server interface 116, and power supply 330. Sources 302 serve as quantum-state-carrier supply 108 (FIG. 1). Recipe hardware 110 (FIG. 1) includes vacuum system 304, laser system 306, magnetics system 308, and power supply 330. Imaging system 310 forms part of observables data capture system 116 (FIG. 1). Ψ-station 106 can be a turnkey quantum-mechanics system such as the QuCAL Ultracold Atom laboratory manufactured by Cold-Quanta, Inc., Boulder Colo.

Source 302 for Ψ-station 106 includes two modules filled with rubidium 87 ($^{87}$Rb). Other cold-atom-type Ψ-stations can include modules filled with cesium 133 ($^{133}$Cs) and/or filled with potassium 39 ($^{39}$K). $^{87}$Rb, $^{133}$Cs, and $^{39}$K are alkali elements with a single electron in their respective outer shells. Alternative source materials can include isotopes of these elements, such as $^{85}$Rb, alkaline earth metals, other elements, various polyatomic molecules, other bosons and fermions. In some embodiments, a Ψ-station can be configured with two or more source materials, e.g., for comparisons across source materials. Different source materials may require different laser frequencies and thus, in some cases, additional lasers.

In Ψ-station 106, $^{87}$Rb atoms can be released into a vacuum by heating one of the source modules. The heating can be effected using resistive heating generated by driving a current through a resistive element in or on the module. Alternatively, a laser can be used to heat the module and/or its contents. The vacuum into which the atoms are released is maintained by a multi-stage vacuum system 304. Vacuum system 304 can be a standard RuBECi double MOT UHV chamber, manufactured by ColdQuanta, Inc. Released atoms travel, e.g., upwards, through one or, in other embodiments, more pre-cooling cells to an atom-chip cell, so called because it is capped by an atom chip 326. In various embodiments, reservoirs of pre-cooled quantum-state carriers can be formed in one or more of these cells. Atom chip 326 has a split-wire waveguide design and an integrated optical window respectively for magnetic trapping and thru-chip optical access to trapped ultracold atoms.

Vacuum system 304 can include an ion pump and getter materials to maintain the vacuum conditions within the cells. Vacuum system 304 can include opto-mechanical elements for two-dimensional and three-dimensional laser cooling, optical pumping, and optical probing for time-of-flight or in-situ imaging. In addition, vacuum system 304 can include a photo-optical imaging and projection system, e.g., with a 0.6 NA (numerical aperture) primary objective lens. There is also a two-dimensional acousto-optical beam deflector (AOD) to create dynamic two-dimensional optical potentials projected onto trapped atoms.

The (e.g., upward) movement of the atoms is primarily controlled by laser system 306. Laser system 306 includes three 780 nanometer (nm) Distributed Bragg Reflector (DBR) diode lasers respectively serving as master, cooling slave, and repump slave. In addition, there is a tapered amplifier to increase laser power for cooling. All lasers have associated current drivers, 1- or 2- stage temperature controllers, as well as laser current locking electronics for Doppler-free saturated absorption spectroscopy locking to atomic transitions and offset phase locking to the master laser. By controlling the offset frequency from the master laser, the cooling slave also achieves pump and probe functionality. Additionally, four acousto-optic modulators provide for laser frequency agility (detuning) and fast (~nanosecond) intensity modulation. In addition, there are six optical shutters for binary ON and OFF operation. A blue-detuned 760 nm semiconductor laser provides for repulsive optical potentials. The lasers are used to manipulate internal states, cool, guide, move, trap, and image the atoms.

Atom chip 326 can be used to form a magnetic trap. In alternative embodiments, optical traps are used instead of or in addition to the magnetic trap produced by an atom chip (e.g., to trap a BEC). Thus, some embodiments dispense with an atom chip; completing the vacuum boundary with a glass or silicon wall as part of the vacuum boundary.

Laser system 306 cooperates with magnetics system 308 to define two-dimensional and three-dimensional magneto-optical traps (MOTs). Magnetic system 308 includes permanent magnets around the pre-cooling cell and copper electromagnetic field coils including x-, y-, and z-bias coils and a quadrupole transport coil around the cold cell; current through these coils generates magnetic fields that help form the MOT in the cold cell. Imaging system 310 includes two CCD cameras for characterizing the atoms in the cold cell: a Basler for time-of-flight imaging and an Andor EMCCD for in-trap imaging.

Controller 112 controls and coordinates the actions of the various other systems. Controller 112 outputs analog and digital signals to control the various systems, e.g., to turn lasers and magnets on and off, and to control currents through atom chip 326. In an alternative embodiment, a controller includes analog inputs for monitoring and diagnostics, e.g., photo-diode signals of MOT loading. Controller 112 runs control system software on National Instruments LabVIEW to create timing files to send to electronics system 182. Controller 112 includes a National Instruments PXI chassis with a real-time environment. Analog and digital output cards connected to the PXI chassis deliver control signals to peripheral electronics. Low-noise current supplies are used for electromagnetic field coils and the atom chip. An arbitrary waveform generator is used to create and execute radio-frequency (RF) waveforms driving the two-dimensional acousto-optical deflector.

The various systems of a Ψ-station can share components. For example, atom chip 174 forms part of the electronics system, part of the magnetics system, and part of the vacuum system. Comparing FIGS. 1 and 3, recipe hardware 110 (FIG. 1) includes vacuum system 304, laser system 306, magnetics system 308, and electronics system 312 (excluding controller 112 and server interface 116). Imaging system 310 (FIG. 3) is included in observable data capture 114.

From a user's viewpoint, interaction with graphical user interface 144 (FIG. 1) sends a selected recipe to a Ψ-station and the Ψ-station returns results, e.g., in the form of a wavefunction characterization descriptive of the physical state(s) of the relevant quantum-state carriers in the Ψ-station. The graphical user interface allows user definitions of multi-stage BEC generation recipes controlling 24 analog and 16 digital control lines. The GUI allows graphical visualization or control signal levels (constant, linear ramp, exponential, sinusoid, and user input functions).

Herein, use cases for Ψ-station 106 include: basic Bose-Einstein condensate (BEC) production, atomtronics, and shaken lattice. In the basic BEC use case, a user is given control over one or more of the following parameters: 1) laser cooling; 2) optical pumping; 3) quadrupole magnetic trapping and transport; 4) atom-chip loading; 5) evaporation (final-stage cooling); and 6) atom-chip trap decompression and imaging. Control of laser cooling can include control over a magneto-optical trap (MOT), a compressed magneto-optical trap (CMOT), and polarization gradient cooling (PGC). This control includes control over magnetic quadrupole and bias fields, laser tuning, and stage duration. Control over optical pumping can include control over magnetic bias fields and laser pulse duration. Control over atom-chip loading can include control over magnetic quadrupole and bias fields, current in atom-chip traces, and stage duration. Control over evaporation can include control over bias fields, current in atom-chip traces, radio-frequency knife frequency, radio-frequency knife power, and stage duration. Control over atom-chip trap decompression and imaging can include control over bias fields, current in atom chip traces, stage duration, time of flight (time between trap release and image), and probe pulse duration.

Which parameters are presented to a user can depend on account type (e.g., real time accounts, scheduled accounts, stand-by accounts), user/role authorization (e.g., administrators, project managers, technicians), and user selections. Users interested in creating BECs with specific characteristics or in exploring ways of optimizing BEC production can be given access to all relevant parameters. Others might be given access to only one parameter, or parameters of a single stage, e.g., the evaporation stage. In the latter cases, the other stages and parameters would be pre-set, e.g., pre-optimized. In still other cases, a user who wants to use a BEC as a starting point might have access to a preset recipe for a BEC without any access to underlying settings.

At the end of the BEC production cycle, by tuning the variables on the prior chart, the user can have control over the total number N, the temperature T, and the chemical potential μ of the atoms. Below the critical temperature, $T_c$, there can be $N_c$ condensed atoms and Nth thermal atoms, so the user also has control over the "condensate fraction". Given a number, $N_c$, of condensed atoms, the cloud will have chemical potential μ, that arises due to atomic interactions, in addition to the thermal energy associated with temperature T. Chemical potential depends on the trap "tightness" characterized by the atom-chip trap frequencies, which can be controlled by current in the chip traces and bias field strength.

Figure 4:
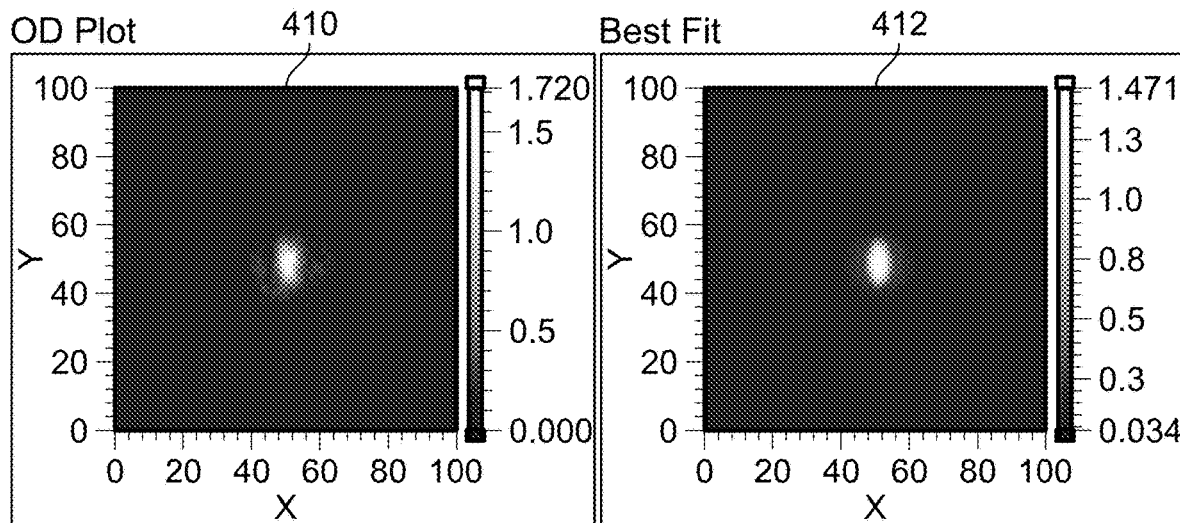
FIG. 4 is a screen shot of a graphic user interface of the ΨaaS system of FIG. 1
Figure 4:
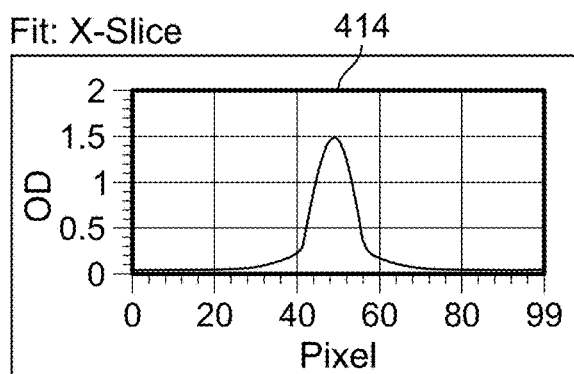
Figure 4:
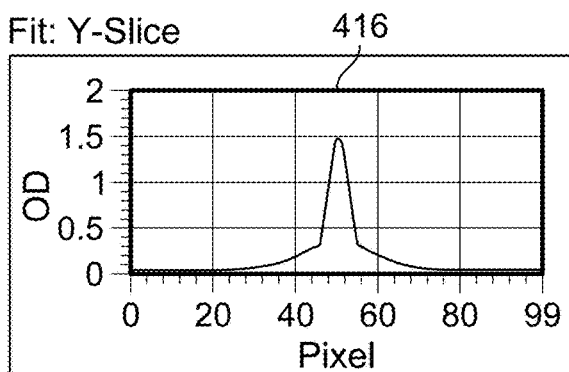

As shown in FIG. 4, graphical user interface (GUI) 144 for a computer is shown presenting to a user controls for time-of-flight (e.g., time after atoms are released from the trap) and for atom temperature T. A slider 402 offers a selection from 5 to 25 milliseconds (ms) for time-of-flight;

the user has selected 20 ms. At ultracold temperatures, a larger time of flight is required to accurately extract thermodynamic properties of the atoms. A slider at 404 offers a selection of atomic temperature from "cold" to "hot" by tuning the RF knife frequency from 2.61 MHz to 2.70 MHz, relative to the trap bottom at 2.60 MHz; in the example of FIG. 4, the user has selected 2.63 MHz. Tuning the radio-frequency (RF) knife frequency nearer to the trap bottom produces pure BECs, while partially condensed clouds are produced for larger RF knife frequencies. Activating (clicking on) a run button 406 causes a BEC with the selected temperature to be produced by Ψ-station 102.

A florescence image 410 is taken at the selected time (20 ms after an optical trap is released). Fluorescence image 410 is processed to yield a best-fit image 412. Depending on the embodiment, the best-fit images and graphs might be generated by the Ψ-station 106, the ΨaaS-server 104, or an app. Graphs 414 and 416 representing an x-dimension slice and ay-dimension slice, respectively, are also provided. In addition, a table 418 specifying numbers of atoms (numerosities) is displayed in the GUI. According to the population data represented in FIG. 4, there are 9076 total atoms, 2383 of which belong to the produced BEC, with 6693 atoms remaining thermal. From these absolute values, fractional or percentage values (e.g., BEC atoms as a percent of total atoms) can be calculated. GUI 144 can present other controls and result representations, depending on user permissions and preferences. The GUI 144 is designed to operate natively on mobile devices, as well, without loss of functionality.

In the atomtronic use case, a user can control Ψ-station 106 to create, modify, and/or operate an atomtronic circuit or circuit element, e.g., the atomtronic transistor described in: Chapters 7-9 of "Single Atom Delivery into a Bottle Beam Trap Using an Optical Conveyor Belt and Quantum Coherent Gain in a Matterwave Transistor" (available at https://scholar.colorado.edu/concern/graduate thesis or dissertations/qz20), a Ph.D. thesis by Brad Anthony Dinardo; and "Experimental Realization of Atomtronic Circuit Elements in Non-Equilibrium Ultracold Atomic Systems" (available at https://scholar.colorado.edu/concern/graduate thesis or dissertations/rr171x224), a Ph.D. thesis by Seth C. Caliga.

Atomtronic circuits are defined by optical potentials that section off different portions of the atomic trap waveguide to control the flow of atoms through the "circuit." Users can have control over: arbitrary optical potentials defined by 2D AOD in high resolution optical projection system; number of atoms, chemical potential in various parts of the circuit/device, temperature; and terminator beam on/off—which couples atoms out of the circuit to prevent unwanted interference with reflected matter waves at the circuit output. In addition to parameters specific to the atomtronics use case, the user can be provided control over the basic BEC parameters.

In the shaken-lattice use case, in addition to controlling the parameters for creating a BEC, the user may be provided with control over the following parameters. All-optical-BEC formation controls and/or atom-chip trap to optical lattice hand-off parameters; optical lattice light intensity to provide user control over trap depth; and shaking function, controlled by user input to a laser phase and/or frequency modulator. Regarding the lattice light intensity: at low lattice depth, atoms can tunnel between adjacent lattice sites, while at high lattice depth (high intensity) atoms are pinned to each lattice site. Regarding the shaking function: independent control over each lattice axis allows arbitrary, uncoupled shaking functions along each axis.

Figure 5:
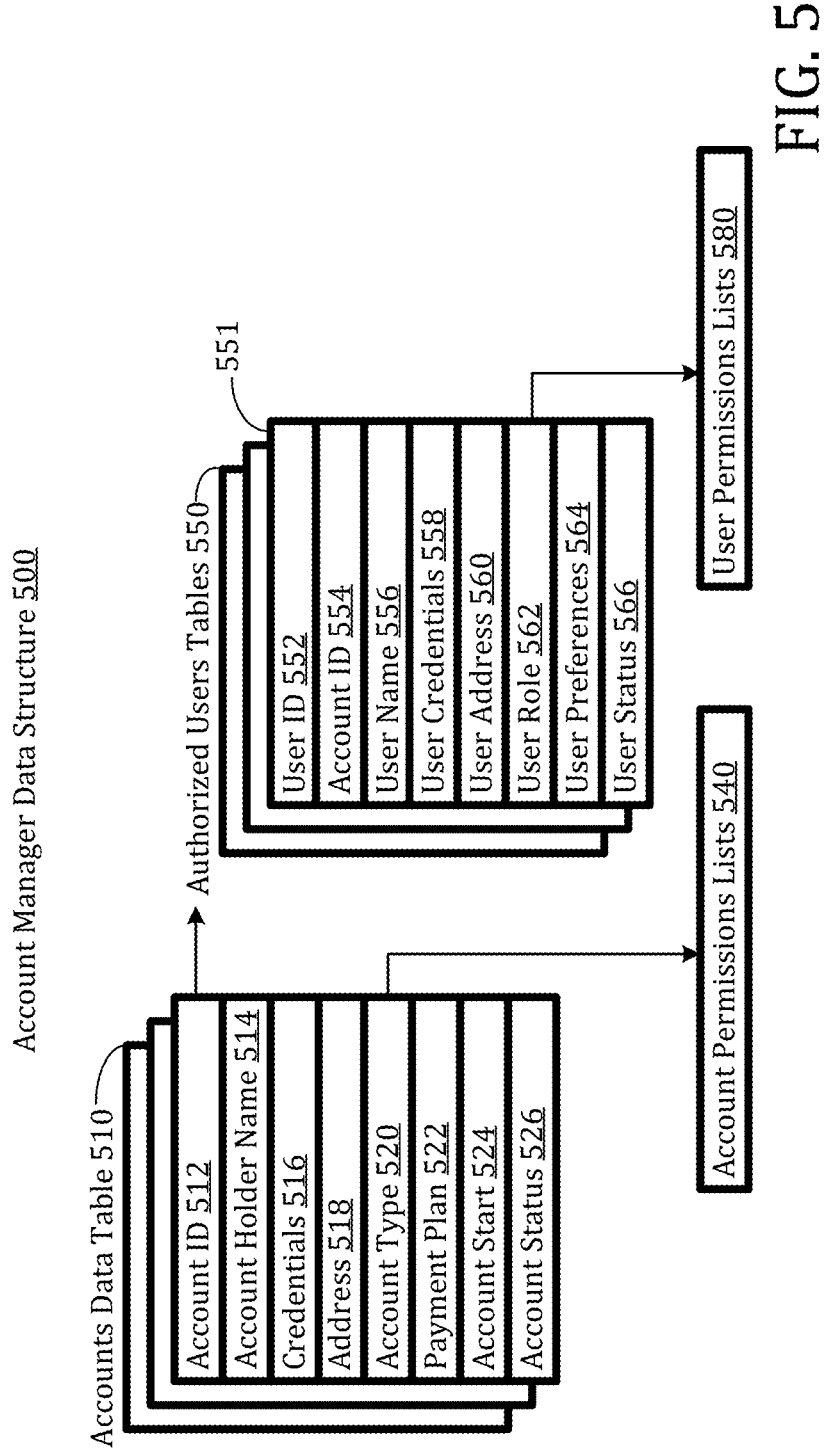
FIG. 5 is a schematic illustration of an account manager data structure for an account manager of the ΨaaS system of FIG. 1.

Account manager 122 (FIG. 1) includes a data structure 500 shown in FIG. 5. Account-manager data structure 500 includes an accounts data table 510, account permissions lists 540, authorized users tables 550, and user permission lists 580. In account data table 510, the records correspond to respective accounts, while the fields correspond respectively to the following fields: account ID 512, account holder name 514, account-holder credentials 516, account-holder address 518, account type 520, payment plan 522, account start date 524, and account status 526. For each distinct account type, there is a corresponding permissions list of account permissions 540 of permissions associated with accounts of that type.

For each account ID there is a corresponding table of authorized users 550, including authorized user table 551. Each record of an authorized user table corresponds to a respective user authorized by the respective account holder to access quantum-mechanics as a service (ΨaaS) System 100. For each authorized user table, the records correspond to respective authorized users, while the fields include: user ID 552, account ID 554 (for reverse lookup), user name 556, user credentials 558, user IP address 560, user role 562, user preferences 564, and user status 566. For each distinct user role (administrator, project manager, senior user, trainee, etc.) there is a respective one of the user permissions lists 550 that defines user permissions (which can be a subset of the account permissions for the corresponding account type).

Figure 6:
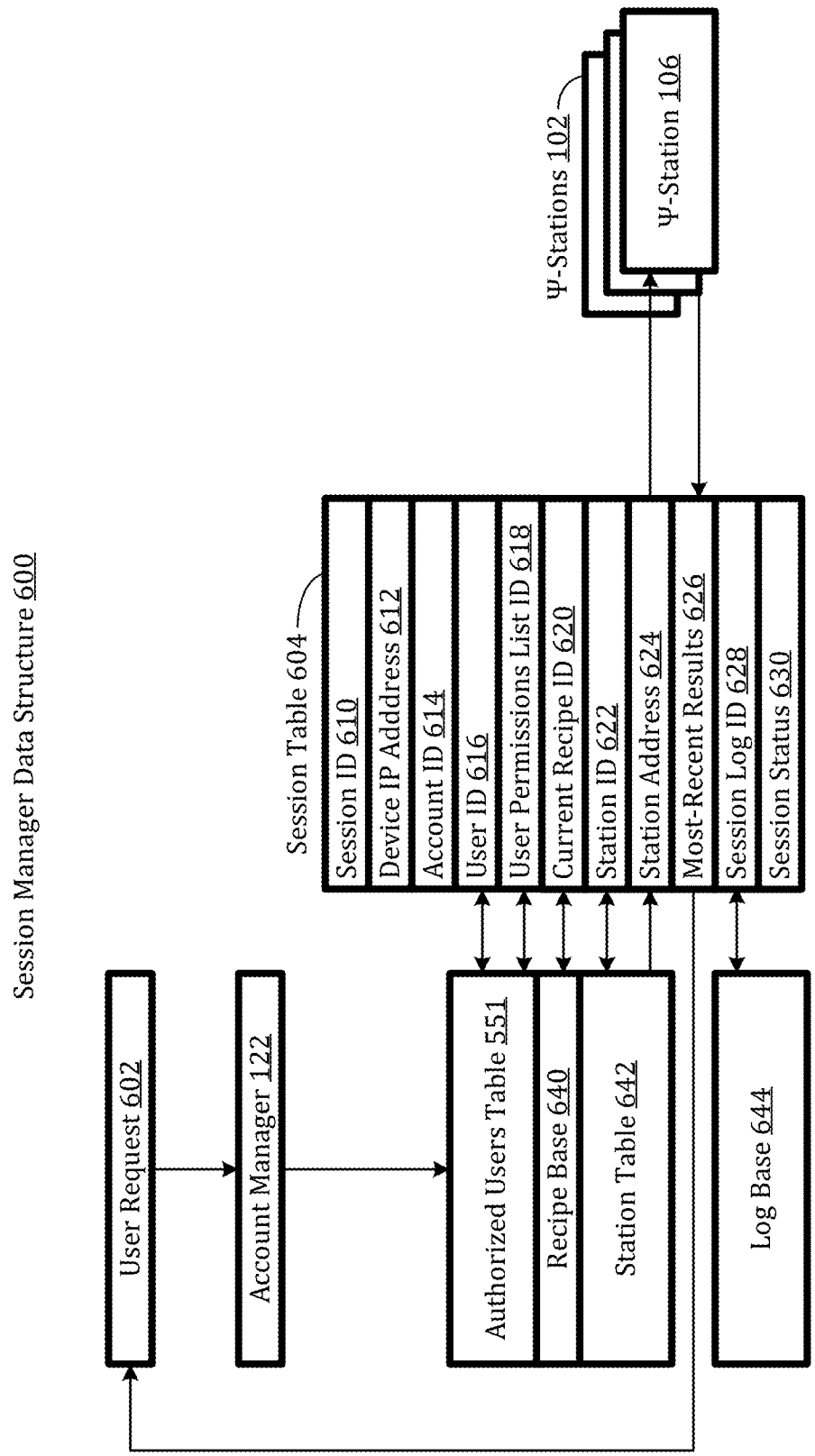
FIG. 6 is a schematic illustration of a session manager data structure for a session manager of the ΨaaS system of FIG. 1.

When, at 201, FIG. 2, a user transmits a first recipe, this amounts to transmitting a user request as indicated at 602 in FIG. 6. The account manager extracts from the request, user credentials to authenticate the user and identify the associated account. The account manager looks up the account to ensure it is active and that the user's authorization is still active. If everything checks out, the account manager forwards to the session manager the request and a pointer to a user permissions list associated with the user/role.

Session manager 124 (FIG. 1) includes a session-manager data structure 600, FIG. 6, which includes a session table 604, a recipe base 640, a station table 642, and a log base 644. Each user request 602 causes session manager 124 to log records into session table 604. Each record in table 604 corresponds to a respective session. In some embodiments, there are separate session tables for each account. The fields for session table 604 are session ID 610 (assigned by session manager 124); device IP address 612 (extracted from request) account ID 614 (provided by account manager 122 from field 554 (FIG. 5) of user table 551; user ID 616 (provided by account manager 122 from field 552 (FIG. 5) of user table 551; user permission list ID 618 (pointer to user permissions list 580 provided by account manager 122); current recipe ID 620 (extracted from original or follow-on request with entry into recipe base 640; station ID 622 (provided by session manager 124 after matching recipe to station types listed in station table 642, which identifies Ψ-stations according to type, e.g., resident quantum carriers; station address 624; most-recent results 626 (forwarded to user at device address); session log ID 628 (pointer to a log in log base 644 for the current session); and session status 630 (e.g., active, iteration number, expired). Once session manager 124 finds an available Ψ-station that matches the requested recipe, it tags the recipe with the session ID and forwards the tagged recipe to the selected Ψ-station.

Herein, "observables" refers to linear operators on the Hilbert space that constitute the possible states of the quantum system. Eigenvalues of the system are then real valued quantities such as number, phase, energy, etc.

"Observables data" characterizing wavefunctions associated with quantum-state carriers (as opposed to solutions to externally-defined problems) is returned by a Ψ-station.

The illustrated embodiments exemplify quantum mechanics as a service (ΨaaS), that provides cloud access for producing, manipulating, and using cold quantum-state carriers. In some scenarios, cold temperatures below 1 milliKelvin and even as low as tens of nanoKelvins are achieved. Applications include cloud access to Ψ-stations for production, manipulation, a use of Bose-Einstein Condensates (BECs), quantum sensing, quantum positioning (e.g., for navigation), and quantum signal processing.

Herein, all art labeled "prior art", if any, is admitted prior art; all art not labeled "prior art", if any, is not admitted prior art. The illustrated embodiment, variations thereupon and modifications thereto are provided for by the present invention, the scope of which is defined by the following claims.

What is claimed is:

1. A quantum-mechanics-as-a-service system comprising:
a quantum-mechanics station including
    a server interface for receiving recipes for producing, manipulating or using quantum-state carriers, and for returning wavefunction characterizations descriptive of a quantum state of the quantum-state carriers,
    recipe-implementation hardware for implementing the recipes, the implementing the recipes including producing, manipulating or using quantum-state carriers; and
    an observables capturer for generating the wavefunction characterizations descriptive of quantum states of the quantum-state carriers, the quantum states resulting from implementation of the recipes for producing, manipulating or using the quantum-state carriers; and
a cloud-based server including
    a station interface for transmitting the recipes to and receiving the wavefunction characterizations from the quantum-mechanics station,
    an account manager for managing accounts, the managing including identifying users associated with the accounts,
    a session manager for managing interactions between users associated with the accounts and the quantum-mechanics station, and
    a device interface for receiving the recipes from user devices and for transmitting the wavefunction characterizations to the user devices over the Internet or other network.

2. The quantum-mechanics-as-a-service system of claim 1 wherein the account manager identifies a pricing plan and authorized users for each of plural accounts.

3. The quantum-mechanics-as-a-service system of claim 1 wherein the session manager provides, to a user, real-time, exclusive, interactive access to the quantum-state carriers.

4. The quantum-mechanics-as-a-service system of claim 1 wherein the session manager manages an online session in which a subsequent recipe is selected after a wavefunction characterization is generated based on implementation of a preceding recipe implemented earlier in the same online session.

5. The quantum-mechanics-as-a-service system of claim 1 wherein the session manager receives an automated branched multi-part recipe calling for a subsequent recipe part to be selected automatically based on a wavefunction characterization results from a preceding recipe part implemented earlier in the same session.

6. A quantum-mechanics-as-a-service process comprising:
    receiving, by a cloud-based server, from a user device of a recipe calling for manipulating quantum-state carriers;
    tagging with a session identifier of the recipe by a session manager of the cloud-based server to yield a tagged recipe;
    forwarding of the tagged recipe to a quantum-mechanics station having quantum-state carriers;
    processing the quantum-state carriers according to the tagged recipe;
    capturing, after the processing, observables data so as to generate a wavefunction characterization descriptive of a quantum-state of the quantum-state carriers resulting from the processing according to the tagged recipe;
    return of the wavefunction characterization to the cloud-based server; and
    forwarding, by the cloud-based server, of the wavefunction characterization to the user device.

7. The quantum-mechanics-as-a-service process of claim 6 further comprising identifying a pricing plan and authorized users for each of plural accounts.

8. The quantum-mechanics-as-a-service process of claim 6 wherein the session manager provides, to a user, real-time, exclusive, interactive access to the quantum-state carriers.

9. The quantum-mechanics-as-a-service process of claim 6 wherein the session manager manages an online session in which a subsequent recipe is selected after a wavefunction characterization generated based on implementation of a preceding recipe implemented earlier in the same online session.

10. The quantum-mechanics-as-a-service process of claim 6 wherein the recipes include an interactive branched multi-part recipe for which a subsequent recipe part is selected by a user after the respective user device has received a wavefunction characterization returned in response to implementation of a preceding recipe part for the same recipe and during the same session.

11. The quantum-mechanics-as-a-service process of claim 6 wherein the session manager manages an online session in which,
    implementation of a first recipe draws the quantum-state carriers from a quantum-state carrier supply and cools them to yield a reservoir of pre-cooled quantum-state carriers; and
    implementation of a subsequent recipe of a multi-recipe session operates on pre-cooled quantum-state carriers drawn from the reservoir.

* * * * *

UNITED STATES PATENT AND TRADEMARK OFFICE
CERTIFICATE OF CORRECTION

PATENT NO. : 11,631,023 B2
APPLICATION NO. : 16/914497
DATED : April 18, 2023
INVENTOR(S) : Dana Zachary Anderson, Seth Charles Caliga and Farhad Majdeteimouri It is certified that error appears in the above-identified patent and that said Letters Patent is hereby corrected as shown below:

In the Specification

In Column 1, Line(s) 59, delete "development" and insert --develop--, therefor.

In the Claims

In Column 11, Line(s) 50, Claim 2, after "claim 1", insert --,--.
In Column 11, Line(s) 53, Claim 3, after "claim 1", insert --,--.
In Column 11, Line(s) 56, Claim 4, after "claim 1", insert --,--.
In Column 12, Line(s) 4, Claim 5, after "claim 1", insert --,--.
In Column 12, Line(s) 30, Claim 7, after "claim 6", insert --,--.
In Column 12, Line(s) 33, Claim 8, after "claim 6", insert --,--.
In Column 12, Line(s) 36, Claim 9, after "claim 6", insert --,--.
In Column 12, Line(s) 42, Claim 10, after "claim 6", insert --,--.
In Column 12, Line(s) 49, Claim 11, after "claim 6", insert --,--.

Signed and Sealed this
Seventeenth Day of October, 2023

Katherine Kelly Vidal
*Director of the United States Patent and Trademark Office*